United States Patent
Bacon et al.

(10) Patent No.: US 7,917,737 B2
(45) Date of Patent: Mar. 29, 2011

(54) SYSTEM AND METHOD FOR MANAGING DATA

(75) Inventors: David Francis Bacon, Sleepy Hollow, NY (US); Perry Cheng, New City, NY (US); David Paul Grove, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 196 days.

(21) Appl. No.: 12/255,771

(22) Filed: Oct. 22, 2008

(65) Prior Publication Data

US 2009/0049282 A1 Feb. 19, 2009

Related U.S. Application Data

(63) Continuation of application No. 10/989,088, filed on Nov. 16, 2004, now Pat. No. 7,457,940.

(51) Int. Cl.
*G06F 12/00* (2006.01)
(52) U.S. Cl. ..................................................... 712/221
(58) Field of Classification Search .................. None
See application file for complete search history.

(56) References Cited

U.S. PATENT DOCUMENTS

| | | | |
|---|---|---|---|
| 5,630,092 A | 5/1997 | Carreiro et al. | |
| 5,652,857 A | 7/1997 | Shimoi et al. | |
| 5,812,817 A | 9/1998 | Hovis et al. | |
| 5,864,859 A | 1/1999 | Franaszek | |
| 5,867,681 A | 2/1999 | Worrell et al. | |
| 5,907,694 A | 5/1999 | Suzuki et al. | |
| 5,960,465 A | 9/1999 | Adams | |
| 6,175,896 B1 * | 1/2001 | Bui | 711/118 |
| 6,237,064 B1 * | 5/2001 | Kumar et al. | 711/122 |
| 6,275,904 B1 * | 8/2001 | Chennupaty et al. | 711/138 |
| 6,324,621 B2 | 11/2001 | Singh et al. | |
| 6,332,172 B1 | 12/2001 | Iverson | |
| 6,349,372 B1 | 2/2002 | Benveniste et al. | |
| 6,427,188 B1 * | 7/2002 | Lyon et al. | 711/122 |
| 6,427,189 B1 * | 7/2002 | Mulla et al. | 711/122 |
| 6,438,676 B1 | 8/2002 | Sijstermans | |
| 6,449,693 B1 * | 9/2002 | Goetz et al. | 711/122 |
| 6,496,882 B2 | 12/2002 | Iverson | |

(Continued)

OTHER PUBLICATIONS

Yang, Jun, Gupta, Rajiv "Energy Efficient Frequent Value Data Cache Design" 2002 IEEE, pp. 197-207.

(Continued)

*Primary Examiner* — Eric Coleman
(74) *Attorney, Agent, or Firm* — Vazken Alexanian; McGinn IP Law Group, PLLC

(57) ABSTRACT

A method of performing data and pointer compression includes, in a buffer which is formed between a processor and a level one cache and stores plural tags and full-word values associated with the tags, when the buffer is presented with an address, breaking the address into a line number which indexes a set of the full-word values, and a tag which is used as a key to determine whether a value in the set of full-word values includes a value associated with the presented address, if a tag in the presented address matches a tag in the buffer, returning a full-word value in the buffer which is associated with the tag, and storing the returned full-word value in a destination register of an instruction which originated the presented address, and if a tag in the presented address does not match a tag in the buffer, generating a fault and branching control to a pre-defined handler.

20 Claims, 9 Drawing Sheets

U.S. PATENT DOCUMENTS

| | | |
|---|---|---|
| 6,516,320 B1 | 2/2003 | Odom et al. |
| 6,523,102 B1 | 2/2003 | Dye et al. |
| 6,618,831 B2 | 9/2003 | Lippincott et al. |
| 6,640,283 B2 * | 10/2003 | Naffziger et al. ............. 711/118 |
| 6,654,874 B1 | 11/2003 | Lee |
| 6,658,549 B2 | 12/2003 | Wilson et al. |
| 6,681,305 B1 | 1/2004 | Frankie et al. |
| 6,775,740 B1 * | 8/2004 | Nishiyama ................... 711/118 |
| 6,842,874 B1 | 1/2005 | Voshell |
| 7,010,665 B1 | 3/2006 | Toll et al. |
| 7,058,783 B2 | 6/2006 | Chandrasekaran et al. |
| 2001/0010072 A1 | 7/2001 | Yoshida |
| 2002/0126545 A1 * | 9/2002 | Warren et al. ................. 365/200 |
| 2002/0156977 A1 | 10/2002 | Derrick et al. |
| 2003/0135694 A1 | 7/2003 | Naffziger et al. |
| 2003/0229761 A1 | 12/2003 | Basu et al. |

OTHER PUBLICATIONS

International Search Report dated Jun. 2, 2006.

* cited by examiner

SYSTEM AND METHOD FOR MANAGING DATA

RELATED APPLICATIONS

This application is a Continuation Application of U.S. patent application Ser. No. 10/989,088, filed on Nov. 16, 2004 now U.S. Pat. No. 7,457,940.

BACKGROUND OF THE INVENTION

1. Field of the Invention

The present invention relates to a system and method for managing data (e.g., processing data, compressing data, storing data, loading data, etc.), and more particularly, a system and method for managing data (e.g., a mix of compressed and uncompressed data) in which first instructions (e.g., a set of first instructions) are used for operating on compressed data and second instructions (e.g., a set of second instructions different from the first instructions) are used for operating on uncompressed data.

2. Description of the Related Art

Memory consumption is becoming an increasingly critical problem at both the low- and high-performance end of the system design spectrum. At the low end, random access memory (RAM) consumes area, power, and financial resources. At the high end, performance is limited by effective cache size and by bandwidth into the cache from RAM, which is becoming steadily slower in terms of clock cycles of the central processing unit (CPU).

Furthermore, many of the bits that are transferred between memory and the CPU are not useful, as the values are amenable to compression. Compression removes redundancy, thus lowering bandwidth requirements and effectively allowing more data to be stored close to the CPU.

Currently, techniques are used which apply compression in an attempt to improve memory efficiency. However, such techniques apply compression relatively far down the memory hierarchy (e.g., between the lowest level of cache and main memory) in a portion of the memory hierarchy that is not very performance sensitive. Therefore, the benefits of such techniques are limited.

SUMMARY OF THE INVENTION

In view of the foregoing and other problems, disadvantages, and drawbacks of the aforementioned systems and methods, it is a purpose of the exemplary aspects of the present invention to provide a system and method for managing data which may increase the effective size not only of random access memory (RAM) but also of the cache memory (e.g. data cache or "D-cache"), leading to significant performance improvements.

The exemplary aspects of the present invention include a processor which executes a set of instructions for operating on compressed data and another set of instructions for operating on uncompressed data. Importantly, the another set of instructions may be different than the set of instructions. Further, the set of instructions and the another set of instructions may include load instructions and store instructions.

The system may further include a first level of memory cache formed adjacent to the processor, and a module for at least one of compressing and uncompressing data, formed between the first level of memory cache and the processor. Further, the module may include a software module including a data fetch buffer.

The module may store different sentinel values which trade signed and unsigned instructions for a range of values. For example, the module may compress data from 64 bits to 32 bits, 32 bits to 16 bits, 32 bits to 8 bits, and 16 bits to 8 bits.

In the present invention, a decision regarding whether to use the set of instructions or the another set of instructions to access data at a particular memory location, may be made by a language runtime system based on a likelihood of a value stored at the location being compressible.

Further, the system may further include a software module for executing instructions which emulate a compressed load instruction and compressed store instruction via sequences of ordinary instructions. The software module may compress data using mostly relative addressing, such that most pointer values are stored in relative form, except for some distinguished subset of values that are stored in a different form. The data may include, for example, pointers, the software module combining with mostly relative addressing to compress the pointers.

Another aspect of the present invention includes an integrated circuit device which includes a central processing unit (CPU) which executes a set of instructions for operating on compressed data and another set of instructions for operating on uncompressed data, a memory cache formed adjacent to the CPU, and a buffer formed between the CPU and the memory cache. The buffer may operates under user-mode program control to compress data (e.g., values and pointers).

Further, the buffer may include a hardware hash table accelerator which may be indexed by effective address, and augmented with special instructions to support value compression.

The device may further include a software virtual machine for a programming language which uses the buffer based on a likelihood of a value being compressible. In one exemplary embodiment, the buffer may include a fixed-size set-associative buffer. The buffer may also include a special-purpose user-readable and writable cache comprising full-word values which are indexed by memory address.

For example, in an exemplary aspect of the present invention, when the buffer is presented with an address, the buffer breaks the address into a line number which indexes a set of values, and a tag which may be used as a key to identify a member of the set which matches the value associated with the address, and if the tag matches a member of the set, an associated full-word value in the buffer may be returned and stored in a destination register of the originating instruction, and if the tag does not match a member of the set, a buffer fault may be generated, and control branches to a pre-defined handler.

Further, when an overflow occurs, the buffer may consult a software hash table which has a same logical structure as the buffer and maps an address at which an overflowed near pointer may be stored onto an actual full-word absolute address.

For example, the set of instructions may include a Load and Uncompress Halfword Unsigned (luhu) instruction which may be executed by the CPU to perform an operation in which, if a value is less than a maximum unsigned halfword quantity, the value may be returned in a destination register, zero-extended, and if a value is not less than the maximum unsigned halfword quantity, a maximum unsigned value acts as a sentinel and an effective address may be used as a key to look up a full-word value in the buffer.

The set of instructions may also include a pointer extract instruction which may be executed by the CPU to perform an operation in which, if an overflow (OV) condition is 1, a value in a destination register may be a full-word quantity retrieved from the buffer and the destination register may be left unchanged, and if the overflow (OV) condition is other than 1, the destination register may include a compressed pointer.

The set of instructions may include a Store and Compress Halfword Unsigned (schu) instruction. The set of instructions may include a Load and Uncompress Halfword Signed (luh) instruction which may be executed by the CPU to perform an operation in which a maximum negative value acts as an overflow sentinel, and the half-word may be sign-extended.

The set of instructions may include a Store and Compress Halfword Signed (sch) instruction. The set of instructions may include Load and Uncompress Byte Unsigned (lubu) instruction which may be executed by the CPU to perform an operation in which if a value is less than a maximum unsigned byte quantity, the value may be returned in a destination register, zero-extended, and if a value is not less than the maximum unsigned byte quantity, an effective address may be used as a key to look up a full-word value in the buffer.

Further, if a pointer is null, a null sentinel value may be stored, and if the pointer is non-null, the pointer may be converted into a signed offset and, if the pointer fits in a halfword, the pointer may be stored in an addressed memory, and if the pointer does not fit in a halfword, an entry may be one of created an replaced in the buffer.

Further, the set of instructions may include a Pointer Extract instruction which may be executed by the CPU to perform an operation in which if a destination register $r_d$ contains a sentinel value for null, the register $r_d$ may be cleared, and if the destination register $r_d$ does not contain a sentinel value for null, an offset may be added to a content of a source register $r_s$ to produce an effective address from which a contents of the register $r_d$ were loaded. The set of instructions may also include a pointer compress instruction which may be executed by the CPU to perform an operation in which if a source register $r_s$ is null, a pointer may be changed to a sentinel value, and if the source register $r_s$ is not null, the register $r_s$ may be converted into a relative pointer by subtracting an effective address.

Another aspect of the present invention includes a method of managing data, which includes executing a set of instructions for operating on compressed data and another set of instructions for operating on uncompressed data.

Another aspect of the present invention includes a programmable storage medium tangibly embodying a program of machine readable instructions executable by a digital processing apparatus to perform the method of managing data according to the exemplary aspects of the present invention.

Another aspect of the present invention includes a method for deploying computing infrastructure in which computer-readable code is integrated into a computing system, such that the code and the computing system combine to perform a method of managing data according to the exemplary aspects of the present invention.

With its unique and novel features, the exemplary aspects of the present invention provide a system and method of managing data which may increase the effective size not only of RAM but also of the D-cache, leading to significant performance improvements.

BRIEF DESCRIPTION OF THE DRAWINGS

The foregoing and other objects, aspects and advantages will be better understood from the following detailed description of the embodiments of the invention with reference to the drawings, in which.

DETAILED DESCRIPTION OF THE EXEMPLARY EMBODIMENTS OF THE INVENTION

Figure 1:
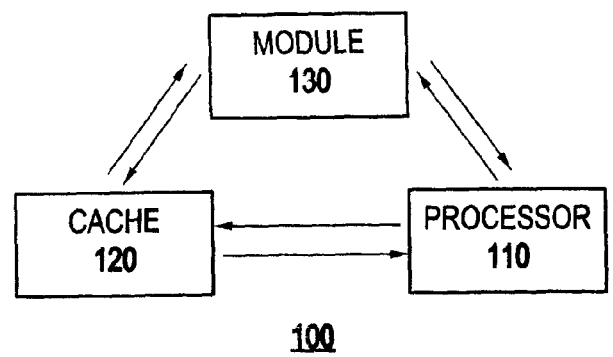
FIG. 1 illustrates a system 100 for managing data according to the exemplary aspects of the present invention.

Referring now to the drawings, FIG. 1 illustrates a system 100 for managing data. The system includes a processor 110 (e.g., at least one processor) which executes a set of instructions (e.g., first instructions) for operating on compressed data and another set of instructions (e.g., second instructions which may be different from the first instructions) for operating on uncompressed data.

In an exemplary embodiment, the system 100 may include a first level of memory cache 120 which is formed adjacent to the processor 110, and a module 130 (e.g., a hardware or software compression and uncompression module) for at least one of compressing (e.g., transparent value and data compression) and uncompressing data, formed (e.g., operate on said data) between the first level of memory cache and the processor. For example, the module 130 may include a data fetch buffer (e.g., a big data fetch buffer (BDFB)) which may include an efficient hardware support for transparent data and pointer compression.

In the present invention, the module to compress/uncompress data may be completely emulated on standard hardware by using 1) a sequence of normal instructions to emulate the load/store instructions (e.g., load instructions and/or store instructions), and 2) an all software structure. Thus, no additional hardware module is needed adjacent to the processor and the first level of cache.

Unlike conventional techniques which apply compression relatively far down the memory hierarchy (e.g., between the lowest level of cache and main memory), an exemplary aspect of the present invention provides improvements by developing a system and method that are efficient enough to be applied at the most performance sensitive portion of the memory hierarchy: between the processor (e.g., central processing unit (CPU)) and the first level of cache.

An exemplary aspect of the present invention presents the design and evaluation of a new hardware lookaside buffer (e.g., a Big Data Fetch Buffer (BDFB)), which can be used under user-mode program control to compress both data and pointers. The BDFB may include, for example, a hardware hash table accelerator, indexed by effective address, augmented with special instructions to support value compression.

The inventors have performed measurements that show that a modestly-sized BDFB can yield factor-of-two compression for a large fraction of the data objects in a Java virtual machine. Furthermore, since data is stored in compressed form in the data cache, the exemplary aspects of the present invention increases the effective size not only of RAM but also of the D-cache, leading to significant performance improvements. Thus the exemplary aspects of the present invention (e.g., including the BDFB) may lead to reduced area, power, and RAM requirements, while simultaneously increasing performance.

The Big Data Fetch Buffer

The BDFB can be used to perform various kinds of compression and optimization. The BDFB may include, for example, a special-purpose user-readable and writable cache of full-word (e.g., 32-bit) values, indexed by memory address. When the BDFB is presented with an address, it breaks the address into a line number and a tag, just like an ordinary cache. The line number can index a set of values, and the tag can be used as a key to determine which (if any) member of the set contains the value associated with the presented address.

If the tag matches, the associated full-word value in the BDFB can be returned and stored in the destination register of the originating instruction. If the tag does not match, a BDFB fault may be generated, and control may branch to a predefined (user-level) handler.

Figure 2:
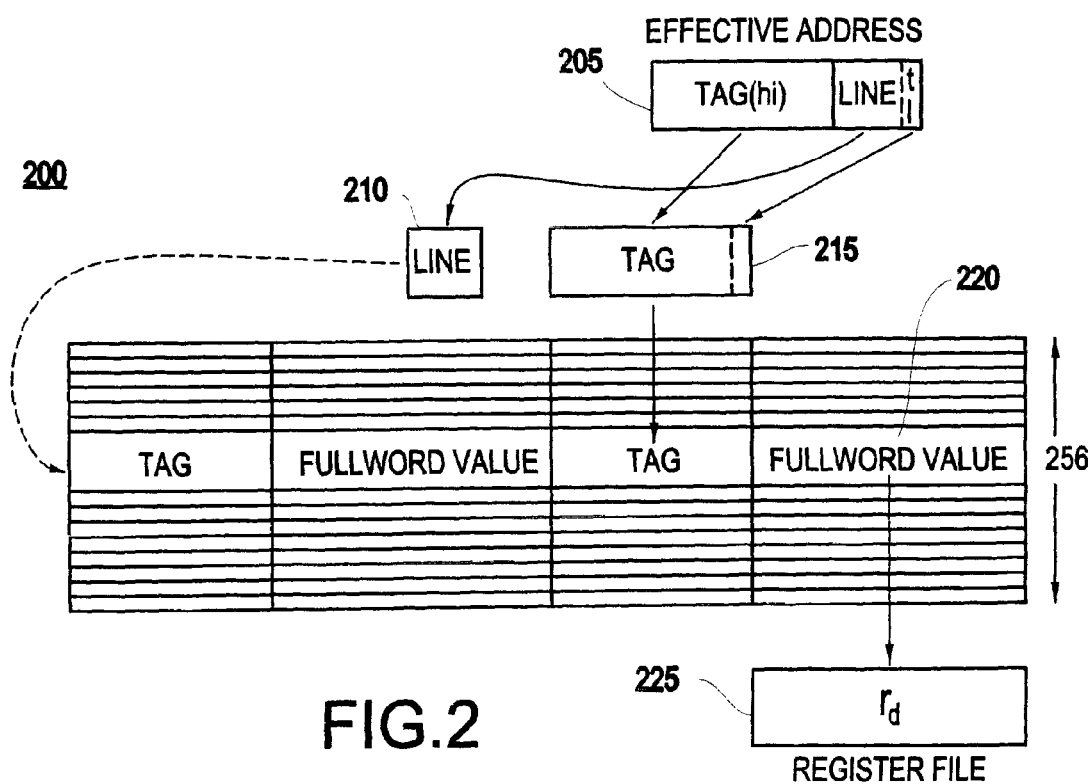
FIG. 2 provides an illustration of how an address may be associated with a full word valued in a BDFB (e.g., a 512-entry, 2 KB, 2-way set-associative Big Data Fetch Buffer (BDFB)), according to the exemplary aspects of the present invention.

FIG. 2 provides an illustration of how an address may be associated with a full word value in a BDFB 200. As illustrated in FIG. 2, the BDFB 200 can break the address 205 into the line number 210 which indexes a set of fullword values, and the tag 215 which is used as a key to determine which (if any) member of the set contains the value associated with the address. The fullword value 220 retrieved from the BDFB may be stored in the destination register $r_d$ 225 of the processor.

For example, FIG. 2 illustrates a 512-entry, 2 KB, 2-way set-associative Big Data Fetch Buffer (BDFB)) according to the exemplary aspects of the present invention. In this exemplary aspect, tags may consume an additional 1.5 KB, for a total space consumption of 3.5 KB. Specifically, the tag 215 may include the high 23 bits and the low bit of the effective address 205, and the intervening 8 bits may form the line number 210.

Further, in order to handle an overflow case, the exemplary aspects of the present invention may maintain a hash table in software (e.g., a Big Data Table (BDT)) that maps the address at which the overflowed value (e.g., near pointer) is stored onto the actual full-word absolute address. An entry in the BDT may be referred to as a Big Data Table Entry (BDTE).

Consulting the hash table in software on every fault would be extremely slow and lead to wild variations in performance. Therefore, the hash table (e.g., BDT) may have the same logical structure as the BDFB which may be used as a hardware-accelerated cache of the BDT entries.

Generally, the BDFB may be manipulated by updating entries, deleting entries, and by flushing the buffer. Further, with respect to context switches, in flushing, user/supervisor bits (e.g., user bits and/or supervisor bits) may be included on tags to avoid a flush on clock tick interrupt.

In addition, in an exemplary aspect of the present invention, the software may be "gone to" only in the event of a hash table collision. Further, a worst-case overhead may be a factor of 2-3 for pointer data.

Value Compression

Pointers are not the only quantities that are smaller than their maximum value with high probability. Many kinds of data fit this paradigm. A number of static techniques have been suggested to address this problem, but there are many cases where static techniques fail.

The exemplary aspects of the present invention (e.g., including the BDFB) may be used for value compression as well as pointer compression, and can be used to handle these cases in a highly efficient manner. Specifically, the invention may be used for generic data compression as well as specialized applications such as for compressed unicode strings (e.g., using one byte per character).

Figure 3:
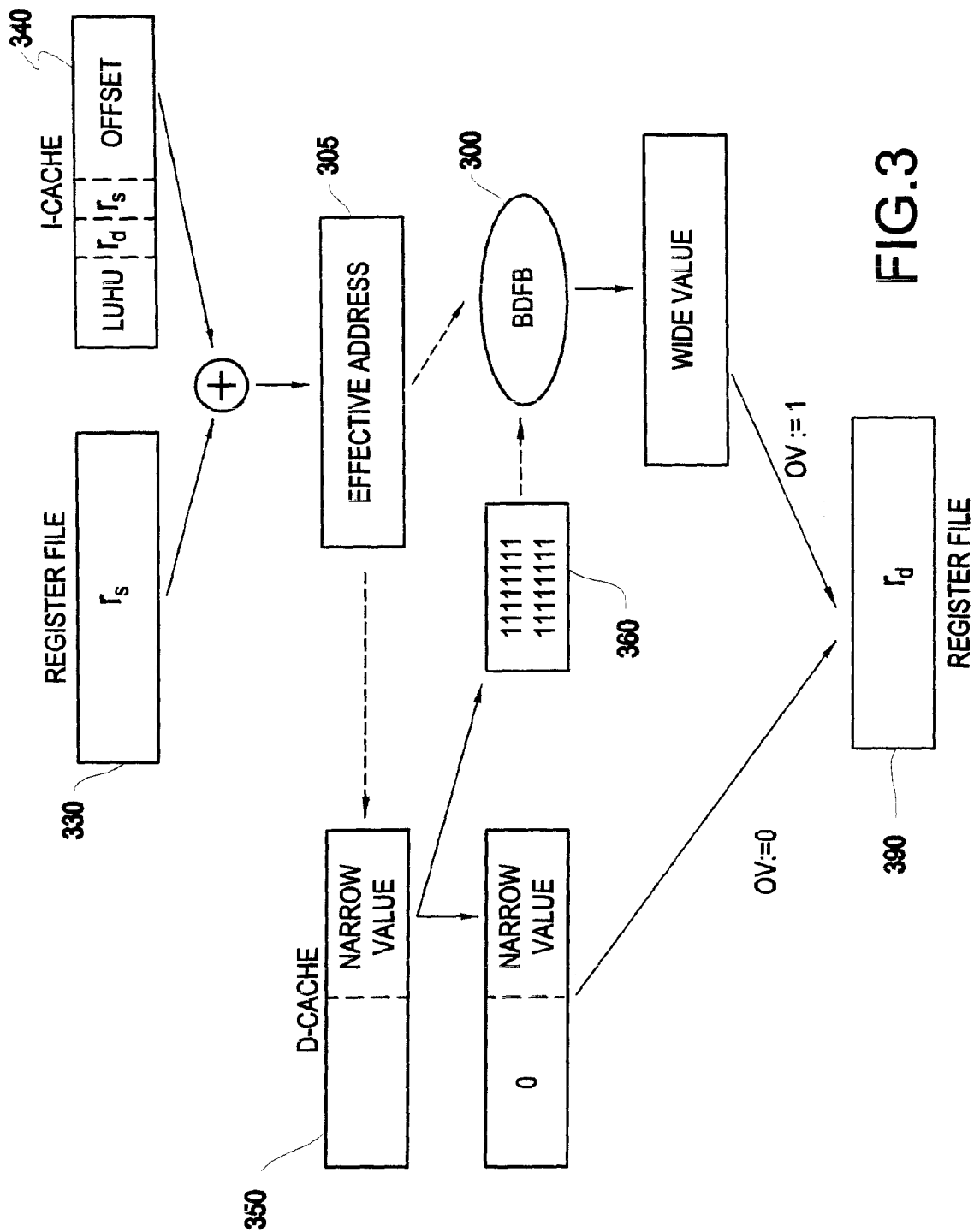
FIG. 3 is a flowchart illustrating the use of the BDFB for operation of a Load and Uncompress Halfword Unsigned (luhu) instruction, according to the exemplary aspects of the present invention.
Figure 4:
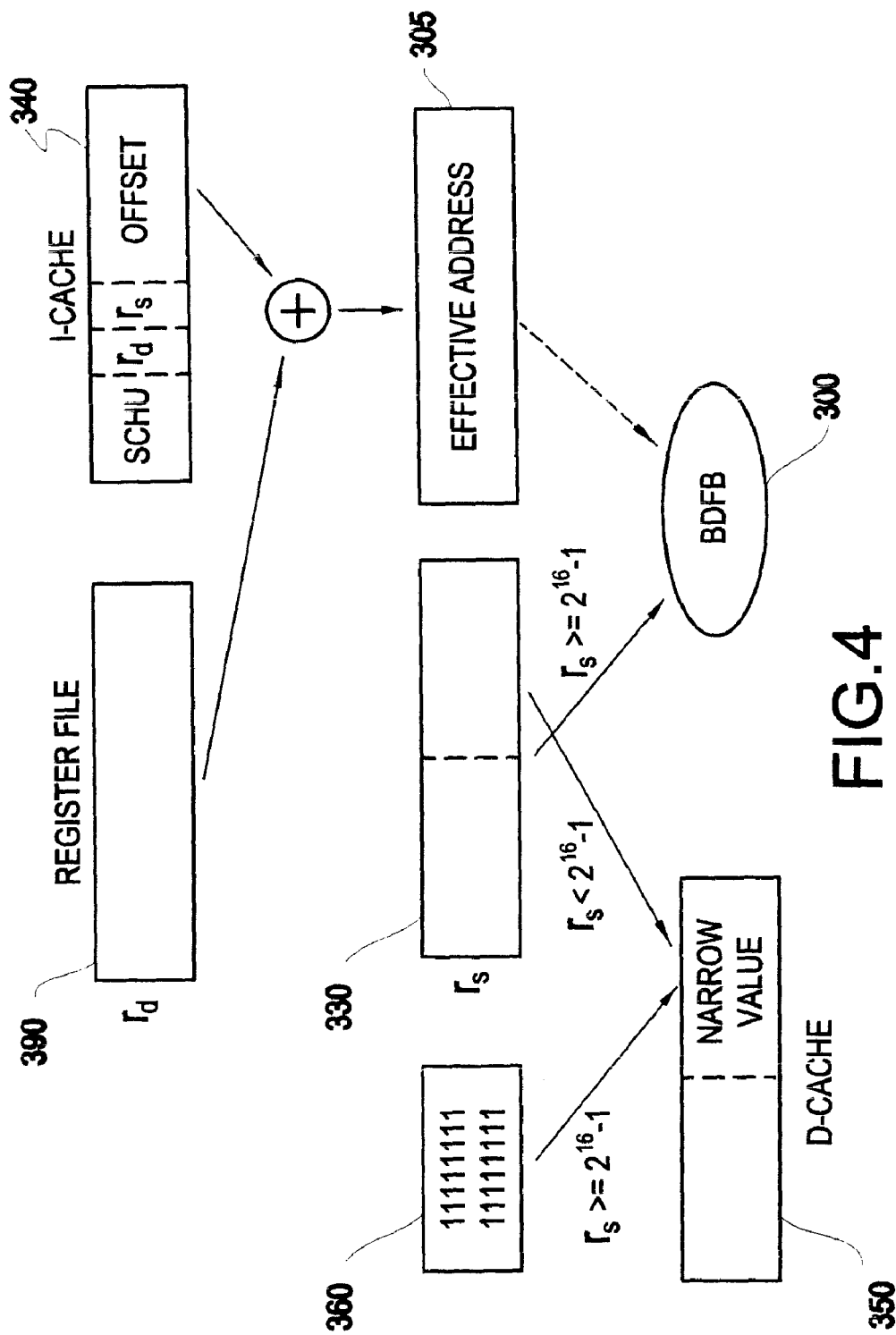
FIG. 4 is a flowchart illustrating the use of the BDFB for operation of the Store and Compress Halfword Unsigned (schu) instruction, according to the exemplary aspects of the present invention.
Figure 5:
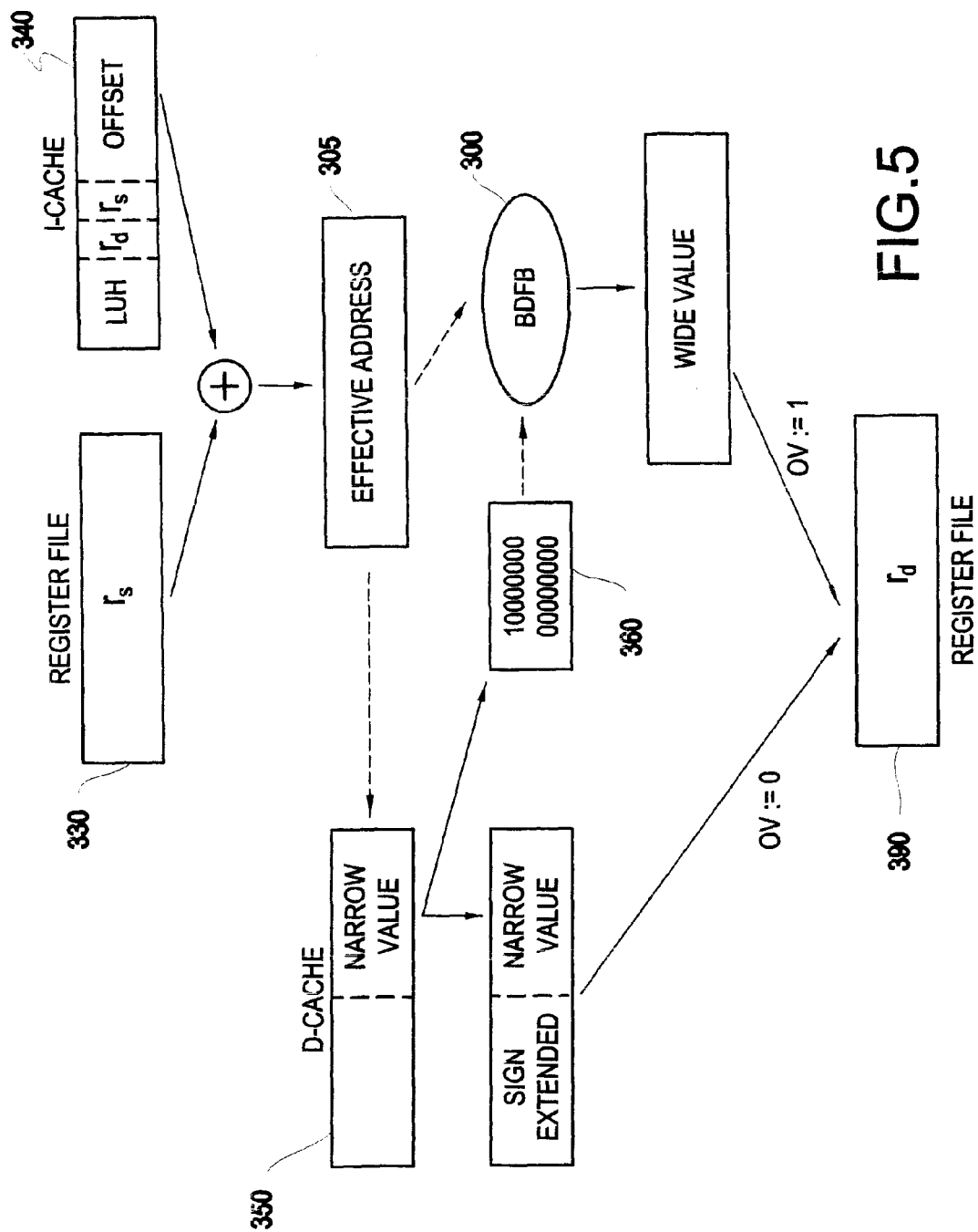
FIG. 5 is a flowchart illustrating the use of the BDFB for operation of the Load and Uncompress Halfword signed (luh) instruction, according to the exemplary aspects of the present invention.
Figure 6:
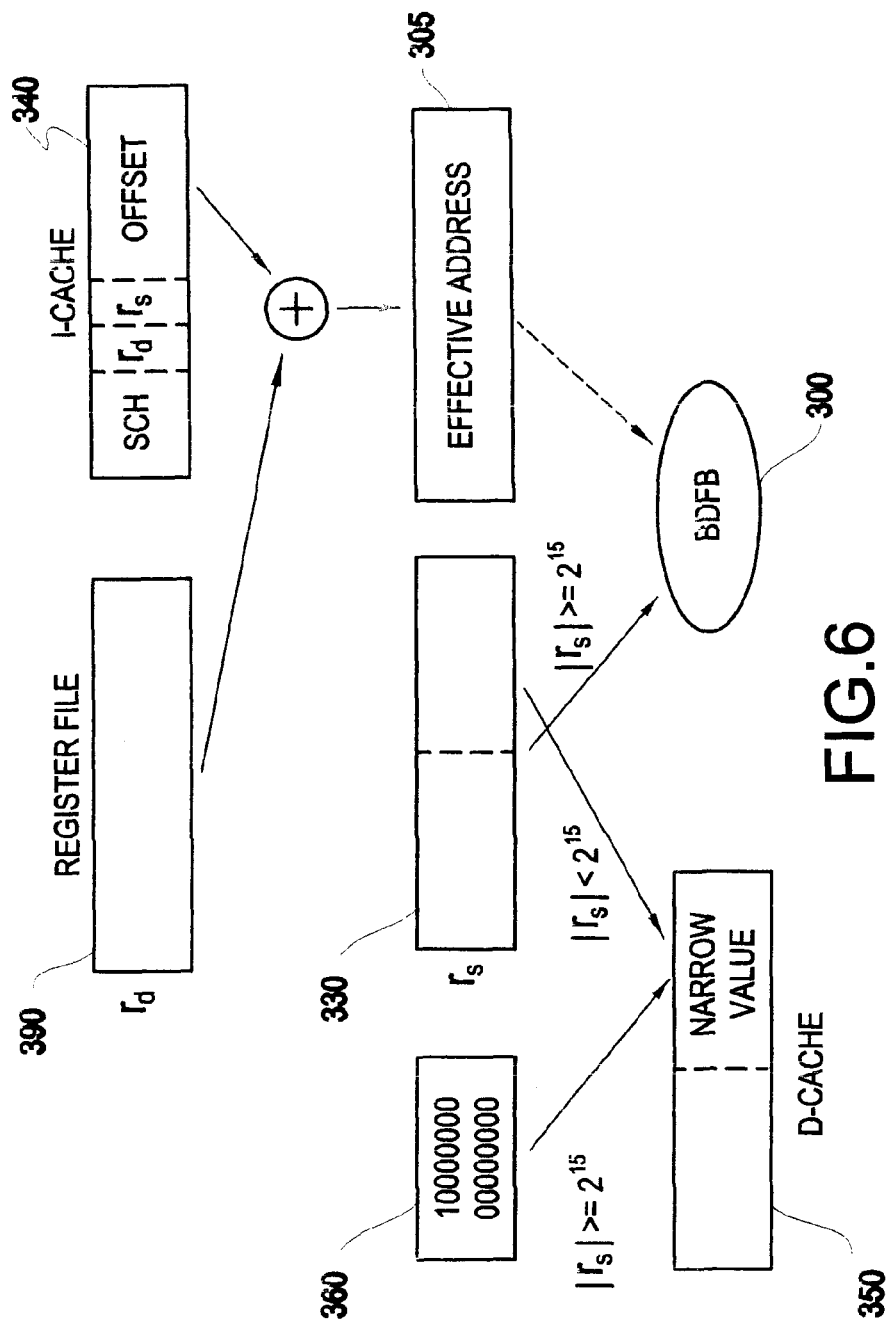
FIG. 6 is a flowchart illustrating the use of the BDFB for operation of the Store and Compress Halfword signed (sch) instruction, according to the exemplary aspects of the present invention.
Figure 7:
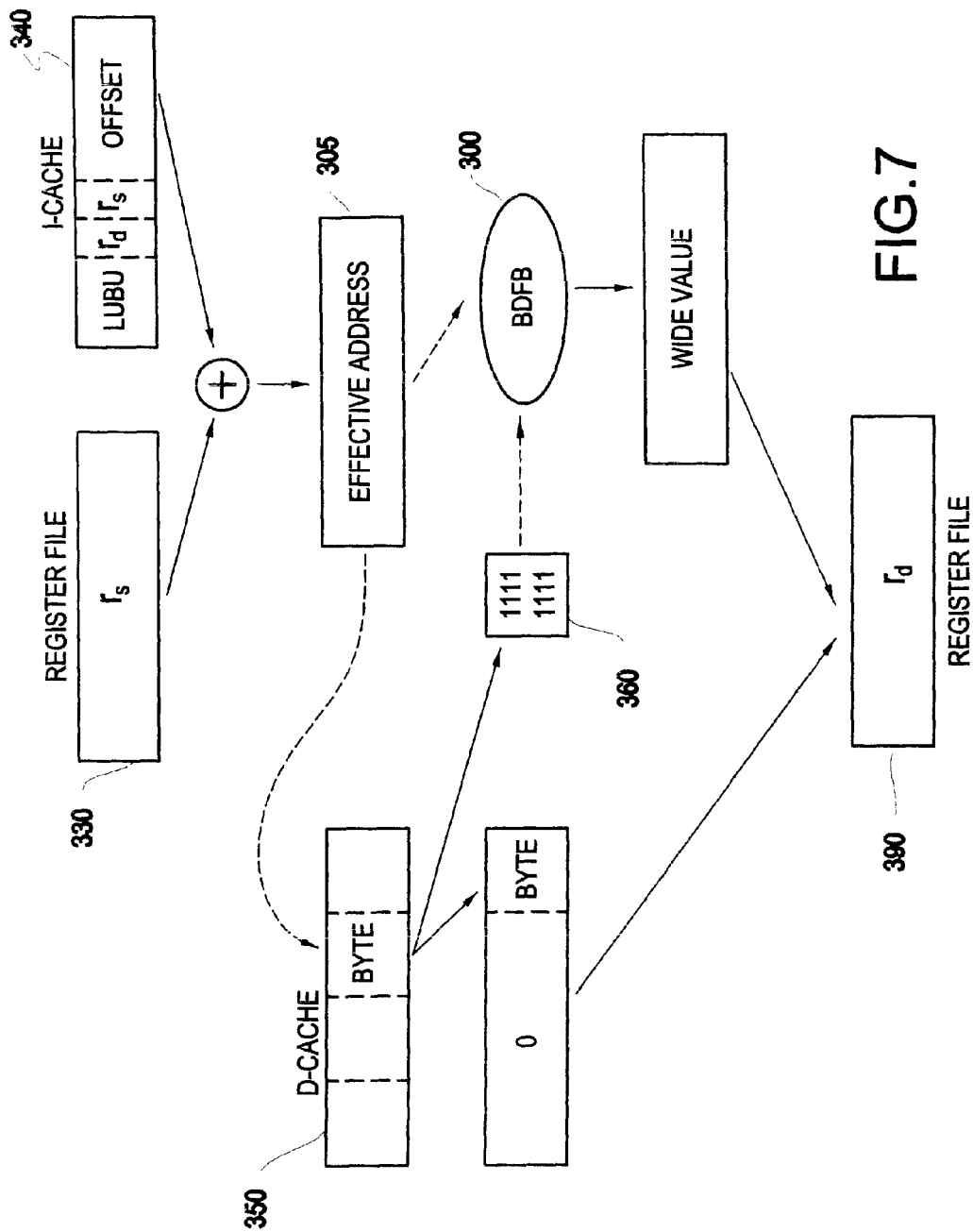
FIG. 7 is a flowchart illustrating the use of the BDFB for operation of the Load and Uncompress Byte Unsigned (lubu) instruction, according to the exemplary aspects of the present invention.

For example, FIGS. 3-7 include flowcharts illustrating various operations of instructions in the present invention. Generally, FIGS. 3, 5 and 7 illustrate an operation of load and uncompress instructions (e.g., from the data cache 350 (e.g., at an effective address computed from the source register $r_s$ 330 and offset portion of the instruction in the I-cache 340) to destination register $r_d$ 390) and FIGS. 4 and 6 illustrate the operation of store and compress instructions (e.g., from destination register $r_d$ 390 to the data cache 350 (e.g., at an effective address computed from source register $r_s$ 330 and offset portion of the instruction in the I-cache 340)).

More specifically, FIG. 3 is a flowchart illustrating the use of the BDFB 300 for operation of a Load and Uncompress Halfword Unsigned (luhu) instruction (e.g., stored in an instruction cache (I-cache) 340). In one case (e.g., a typical case), the value (e.g., stored in a data cache (D-cache) 350) is less than the maximum unsigned halfword quantity, and that value is returned in the destination register $r_d$ 390, zero-extended. Otherwise, the maximum unsigned value acts as a sentinel 360, and the effective address 305 is used as a key to look up the full-word value in the BDFB 300.

FIG. 4 illustrates the use of the BDFB for operation of the Store and Compress Halfword Unsigned (schu) instruction. In this case, the offset (e.g., from I-cache 340) may be added to the contents of the source register $r_s$ 330 to produce the effective address 305 which is presented to the BDFB 300. Where the value of the source register $r_s$ 330 is greater than or equal to the maximum unsigned halfword quantity (e.g., $r_s >= 2^{16}-1$) the value may be stored in the BDFB 300 and the sentinel value 360 may be stored in the data cache (D-cache) 350. Otherwise, where the value of the source register $r_s$ 330 is less the maximum unsigned halfword quantity (e.g., $r_s < 2^{16}-1$), the value may be stored in the data cache (D-cache) 350.

FIG. 5 illustrates the use of the BDFB 300 for operation of the Load and Uncompress Halfword signed (luh) instruction. The operation of the luh instruction is similar to that of the luhu instruction as illustrated in FIG. 3 and thus, most of the discussion with respect to FIG. 3 applies equally here with respect to FIG. 5. However, unlike with respect to the luhu instruction of FIG. 3, for operation of the luh instruction, the maximum negative value acts as the overflow sentinel, and the halfword is sign-extended instead of zero-extended.

FIG. 6 illustrates the use of the BDFB 300 for operation of the Store and Compress Halfword signed (sch) instruction. The operation of the sch instruction is similar to that of the schu instruction as illustrated in FIG. 4 and thus, most of the discussion with respect to FIG. 4 applies equally here with respect to FIG. 6.

However, unlike with respect to the schu instruction of FIG. 4, for operation of the sch instruction, where the absolute value of the source register $r_s$ 330 is greater than or equal to the maximum halfword quantity (e.g., $|r_s| >= 2^{15}$) the value may be stored in the BDFB 300 and the sentinel value 360 may be stored in the data cache (D-cache) 350. Otherwise, where the absolute value of the source register $r_s$ 330 is less the maximum halfword quantity (e.g., $|r_s| < 2^{15}$), the value may be stored in the data cache (D-cache) 350.

FIG. 7 illustrates the use of the BDFB 300 for operation of the Load and Uncompress Byte Unsigned (lubu) instruction. This operation is similar to the operation of the luhu instruction of FIG. 3 (and thus, most of the discussion above with respect to FIG. 3 may be equally applicable here), except that a "byte" quantity is used instead of a "halfword" quantity.

In one case (e.g., a typical case), the value (e.g., stored in the data cache 350) is less than the maximum unsigned byte quantity (e.g., 255), and that value is returned in the destination register $r_d$ 390, zero-extended. Otherwise, the maximum unsigned byte quantity (e.g., 255) acts as a sentinel 360, and the effective address 305 is used as a key to look up the full-word value in the BDFB 300.

Pointer Compression

The exemplary aspects of the present invention (e.g., the BDFB) may also be used to reduce storage requirements for pointers (e.g., "near pointers" and "far pointers"). Far pointers include absolute, full-ward quantities, whereas near pointers include relative, half-word quantities. Near pointers may be stored as signed 16-bit values, which are relative to their own address in storage.

Traditionally, near pointer/far pointer (e.g., near pointer and/or far pointer) systems have been execrated by programmers because such systems require significant extra coding and a lower the level of abstraction, and often require multiple versions of code paths.

However, the exemplary aspects of the present invention may use the BDFB to provide the benefits of the compressed pointer representation while making the distinction transparent to the program. Specifically, the invention may store pointers in their compressed, relative form in a 16-bit halfword. In a common case, the pointer is expected to fit in 16 bits. In fact, since a word pointer is being loaded, it is known that the low two bits of the resulting pointer will be 0, so the range may be increased to $2^{18}$ bytes or ±128 KB.

There are two other cases: either the pointer is null, or it has overflowed the 18-bit offset. Null pointers are represented by the maximum positive half-word value (0 is not used, since some algorithms rely on being able to employ self-pointers), and result in the destination register being set to 0.

Figure 8:
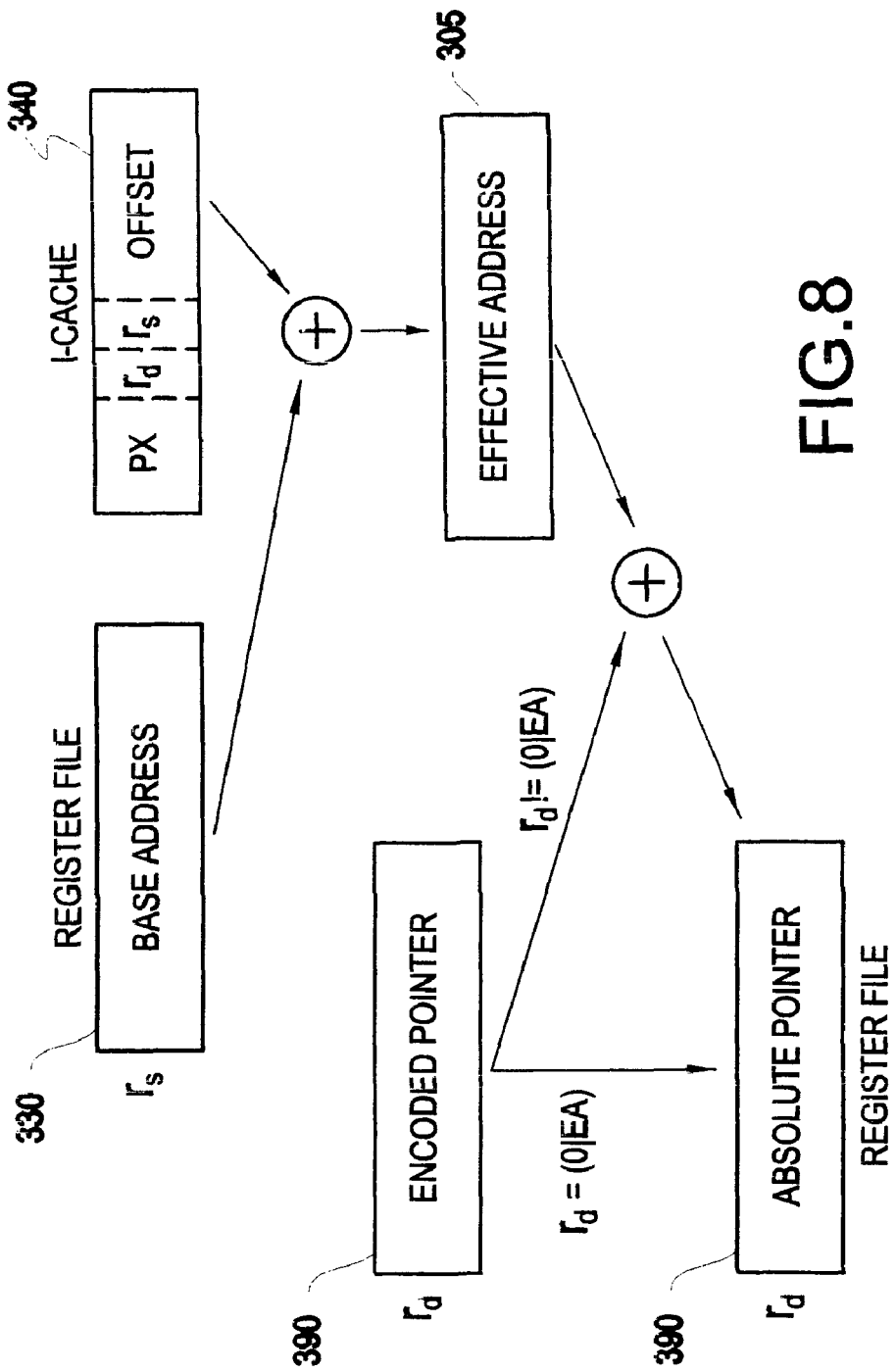
FIG. 8 is a flowchart illustrating the use of the BDFB for operation of a new instruction "Pointer Extract" or px, according to the exemplary aspects of the present invention.

FIG. 8 illustrates the use of the BDFB 300 for operation of a new instruction "Pointer Extract" or px. Generally, if the destination register $r_d$ 390 contains the sentinel value for null, source register $r_s$ 330 is cleared. Otherwise, the offset is added to the contents of the source register $r_s$ 330 to produce the effective address 305 from which the contents of the destination register $r_d$ 390 were loaded. This value is added to the contents of destination register $r_d$ 390 to convert it from a relative pointer to an absolute pointer.

Specifically, the instruction px $r_d$, offset($r_s$) (e.g., from the instruction cache (e.g., I-cache) 340) takes a value loaded by the load and uncompress halfword signed instruction (e.g., luh instruction) (e.g. see FIG. 5) and treats the value as an encoded relative pointer. The register and offset arguments should be exactly the same as for the preceding luh instruction.

The luh instruction will set the overflow (OV) condition code if the loaded value overflowed the half-word and had to be fetched from the BDFB 300. It will also set the equal (EQ) condition code if the half-word value is equivalent to the maximum positive half-word integer, which is used by the pointer compression instructions as a sentinel for the null value.

The pointer extract instruction may operate as follows: if OV=1, it indicates that the value in the destination register $r_d$ 390 is a full-word quantity retrieved from the BDFB 300, in which case the register $r_d$ 390 is left unchanged. Otherwise, register $r_d$ 390 contains a compressed pointer which is either null, or a relative pointer.

If the EQ condition code is set, then register $r_d$ 390 contains the null sentinel value, and register $r_d$ 390 is cleared. If the EQ condition code is not set, then register $r_d$ 390 contains a word-aligned pointer relative to the word-aligned effective address from which it was loaded. In that case, register $r_d$ 390 is set to the sum of the word-aligned effective address 305 and the contents of register $r_d$ 390 left-shifted by two bits.

However, if the value is not found in the BDFB 300, a BDFB Fault is generated, and a previously registered user-level fault handler is invoked. The fault handler then looks up the desired value in the software maintained BDT and updates the BDFB 300.

After the BDFB 300 is updated to contain the value, the handler returns control and the faulting instruction is re-executed. Since the BDFB 300 now contains the desired value, the instruction can complete normally as described above.

There are a variety of instructions in the px (e.g., "pointer extract" instruction) that could be provided. At a minimum, a byte-pointer instruction should be provided, but in fact, relative pointers at various granularities could be useful (e.g., double-word, quad-word, page-size, etc.). The alignment could be provided either as a compile-time constant in the instruction encoding, or dynamically via a third register argument.

Similarly, the exemplary aspects of the present invention could provide support for compressing pointers into byte-wide quantities, or more esoterically, into arbitrary sizes if the invention includes variable byte-width sub-word pointers.

Figure 9:
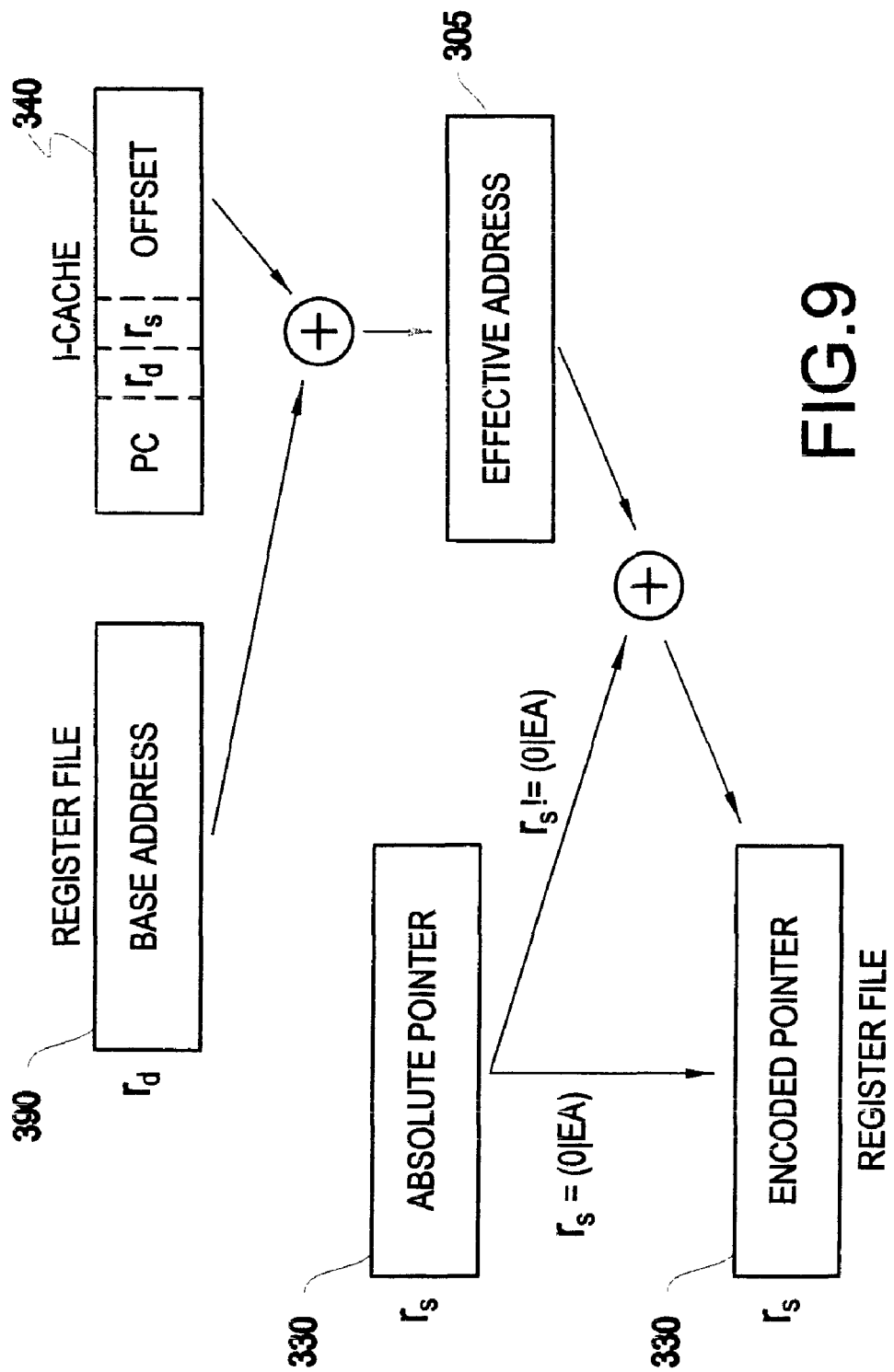
FIG. 9 is a flowchart illustrating the use of the BDFB for operation of the Pointer Compress (pc) instruction, according to the exemplary aspects of the present invention.

FIG. 9 illustrates the use of the BDFB 300 for operation of the Pointer Compress (pc) instruction. Generally, if the source register $r_s$ 330 is null, it is changed to a sentinel value (the maximum positive integer). Otherwise, register $r_s$ 330 is converted into a relative pointer by subtracting the effective address 305.

Specifically, the Pointer Compress (pc) instruction performs the complementary operation to pointer extract instruction px (i.e., pcr$_s$, offset($r_d$)). If the pointer is null, the null sentinel value is stored. If non-null, the pointer is converted into a signed offset and if the pointer fits in a halfword, the pointer is stored in the addressed memory. Otherwise, an entry is created (or replaced) in the BDT and the BDFB 300.

Storing a pointer may cause an entry to be removed from the BDT (and possibly the BDFB 300). Therefore, such stores must obey a write-through policy. Consequently, it is desirable for even the BDFB fault handler to be implemented very efficiently, possibly in hardware. This is certainly the case for a normal (non-colliding) BDT update.

In short, the present invention may include a machine with two sets (e.g., classes) of instructions: instructions for operating on compressed data and instructions (e.g., which are different than the instructions for operating on compressed data) for operating on uncompressed data. Importantly, the data may be compressed/uncompressed (e.g., compressed and/or uncompressed) between the L1 cache (e.g., the level of cache which is closest to the CPU and which may be formed on the same chip as the CPU) and the CPU.

Further, the instructions for compression and uncompression may include load/store (e.g., load instructions and/or store) instructions. For example, the machine may include a big data fetch buffer hardware structure. Further, different sentinel values (high bit vs. distinguished values) may trade signed/unsigned instructions (e.g., signed instructions and/or unsigned instructions) for range of values. In addition, the machine may compress data, for example, from 64 bits to 32 bits, 32 bits to 16 bits, 32 bits to 8 bits, and 16 bits to 8 bits.

Further, a decision regarding whether to use compressed instructions or uncompressed instructions to access the data at a particular memory location, is made by a language runtime system based on the expected likelihood of the values stored at that location being compressible.

Alternatively to being implemented by using a hardware structure, the invention (e.g., machine) may be implemented in software by emulating the compressed load/store instructions via sequences of normal instructions. That is, the big data fetch buffer may be implemented in software (e.g., entirely in software).

In addition, the machine may compress data using mostly relative addressing. That is, most pointer values are stored in relative form (e.g., pointer-effective address or P-EA) except some distinguished subset of values that are stored in a different form. In particular, a scheme where null (0) and EA are handled specially to enable the desirable property that null is always zero (0).

Further, compression of pointers may be performed by combining mostly relative addressing with the big data fetch buffer (hardware, software, hardware/software combination, etc.).

Figure 10:
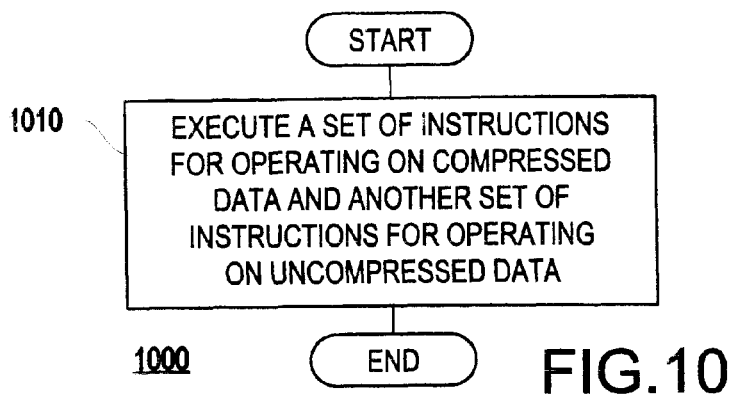
FIG. 10 is a flowchart illustrating a method 1000 for managing data according to the exemplary aspects of the present invention.

As illustrated in FIG. 10, another aspect of the present invention is directed to a method 1000 of managing data which includes executing (100) a set of instructions (e.g., first instructions) for operating on compressed data and another set of instructions (e.g., second instructions which are different than the first instructions) for operating on uncompressed data. The method may further include at least one of compressing and uncompressing data (e.g., values and pointers) between a first level of memory cache and a processor.

Figure 11:
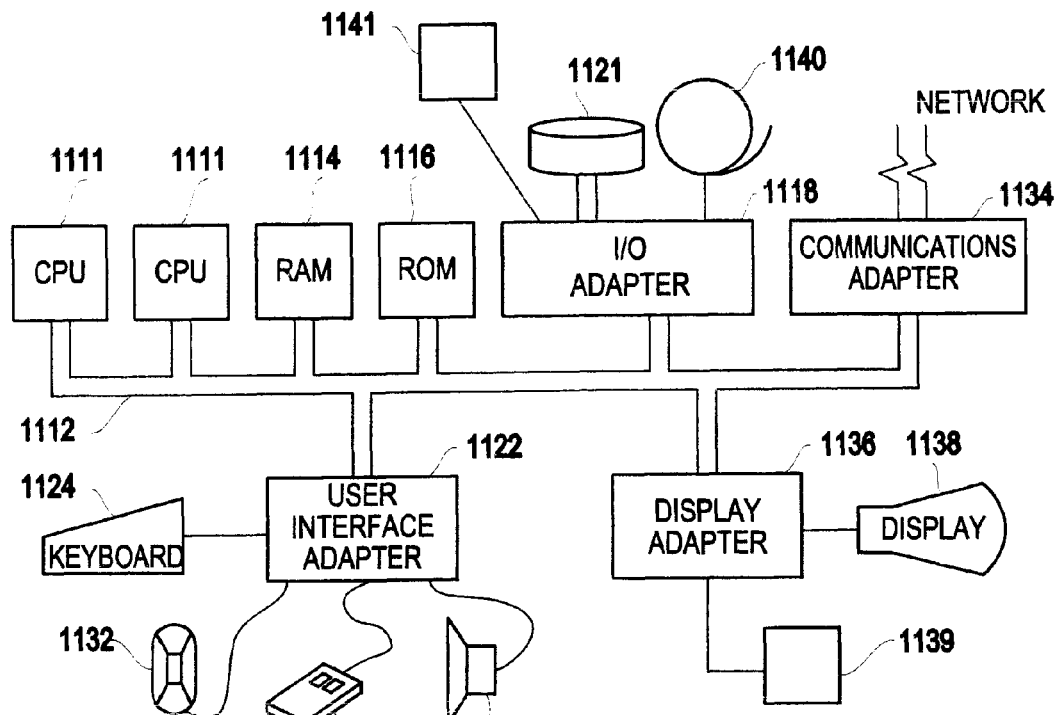
FIG. 11 illustrates a system 1100 which is a typical hardware configuration which may be used for implementing the inventive system and method.

Referring now to FIG. 11, system 1100 illustrates a typical hardware configuration which may be used for implementing the inventive system and method for managing data. The configuration has preferably at least one processor or central processing unit (CPU) 1111. The CPUs 1111 are interconnected via a system bus 1112 to a random access memory (RAM) 1114, read-only memory (ROM) 1116, input/output (I/O) adapter 1118 (for connecting peripheral devices such as disk units 1121 and tape drives 1140 to the bus 1112), user interface adapter 1122 (for connecting a keyboard 1124, mouse 1126, speaker 1128, microphone 1132, and/or other user interface device to the bus 1112), a communication adapter 1134 for connecting an information handling system to a data processing network, the Internet, and Intranet, a personal area network (PAN), etc., and a display adapter 1136 for connecting the bus 1112 to a display device 1138 and/or printer 1139. Further, an automated reader/scanner 1141 may be included. Such readers/scanners are commercially available from many sources.

In addition to the system described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, including signal-bearing media tangibly embodying a program of machine-readable instructions executable by a digital data processor to perform the above method.

Such a method may be implemented, for example, by operating the CPU 1111 to execute a sequence of machine-readable instructions. These instructions may reside in various types of signal bearing media.

Thus, this aspect of the present invention is directed to a programmed product, comprising signal-bearing media tangibly embodying a program of machine-readable instructions executable by a digital data processor incorporating the CPU 1111 and hardware above, to perform the method of the invention.

Figure 12:
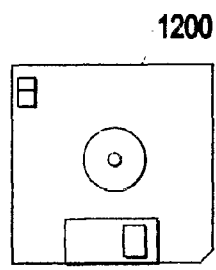
FIG. 12 illustrates a programmable storage medium 1200 (e.g., floppy disk) tangibly embodying a program of machine-readable instructions executable by a digital processing apparatus to perform the inventive method.

This signal-bearing media may include, for example, a RAM contained within the CPU 1111, as represented by the fast-access storage for example. Alternatively, the instructions may be contained in another signal-bearing media, such as a magnetic data storage diskette 1200 (FIG. 12), directly or indirectly accessible by the CPU 1111.

Whether contained in the computer server/CPU 1111, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g., CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, complied from a language such as Java, "C," etc.

With its unique and novel features, the exemplary aspects of the present invention provide a system and method of managing data which may increase the effective size not only of RAM but also of the D-cache, leading to significant performance improvements.

While the invention has been described in terms of one or more embodiments, those skilled in the art will recognize that the invention can be practiced with modification within the spirit and scope of the appended claims. Specifically, one of ordinary skill in the art will understand that the drawings herein are meant to be illustrative, and the design of the inventive assembly is not limited to that disclosed herein but may be modified within the spirit and scope of the present invention.

Further, it should be understood that the term "data" as used herein should be construed to include at least one of values and pointers, but is not limited thereto. It should also be understood that the term "managing data" as used herein should be construed to include at least one of storing data, loading data, compressing data, uncompressing data, but should not be limited thereto.

Further, Applicant's intent is to encompass the equivalents of all claim elements, and no amendment to any claim in the present application should be construed as a disclaimer of any interest in or right to an equivalent of any element or feature of the amended claim.

What is claimed is:

1. A method of performing data and pointer compression, comprising:

in a buffer which is formed between a processor and a level one cache and stores plural tags and full-word values associated with said tags:

when said buffer is presented with an address, breaking said address into a line number which indexes a set of said full-word values, and a tag which is used as a key to determine whether a value in said set of full-word values comprises a value associated with the presented address;

if a tag in said presented address matches a tag in said buffer, returning a full-word value in said buffer which is associated with said tag, and storing the returned full-word value in a destination register of an instruction which originated said presented address; and if a tag in said presented address does not match a tag in said buffer, generating a fault and branching control to a pre-defined handler, wherein said level one cache stores compressed and uncompressed data, wherein said processor accesses said level one cache and executes a set of instructions for operating on said compressed data, and executes another set of instructions which are different than said set of instructions, for operating on said uncompressed data, and wherein said set of instructions and said another set of instructions comprise load instructions and store instructions.

2. The method of claim 1, wherein if an overflow occurs, then said predefined handler looks up a desired value in a software hash table which has a same logical structure as said buffer and maps an address at which an overflowed near pointer is stored onto an actual full-word absolute address.

3. The method of claim 1, wherein said tag in said presented address comprises a high bit and a low bit of said presented address, and said line number comprises a bit intervening between said high and low bits.

4. A method of performing data and pointer compression, comprising:

in a buffer which is formed between a processor and a level one cache and stores plural tags and full-word values associated with said tags:

when said buffer is presented with an address, breaking said address into a line number which indexes a set of said full-word values, and a tag which is used as a key to determine whether a value in said set of full-word values comprises a value associated with the presented address;

if a tag in said presented address matches a tag in said buffer, returning a full-word value in said buffer which is associated with said tag, and storing the returned full-word value in a destination register of an instruction which originated said presented address; and if a tag in said presented address does not match a tag in said buffer, generating a fault and branching control to a pre-defined handler, wherein if said originating instruction comprises a Load and Uncompress Halfword Unsigned (luhu) instruction, then:

if a value loaded by said instruction is less than a maximum unsigned halfword quantity, said value is returned in a destination register, zero-extended; and if said value is not less than said maximum unsigned halfword quantity, said maximum unsigned halfword quantity acts as a sentinel and an effective address is used to look up a full-word value in said buffer.

5. A method of performing data and pointer compression, comprising:

in a buffer which is formed between a processor and a level one cache and stores plural tags and full-word values associated with said tags:

when said buffer is presented with an address, breaking said address into a line number which indexes a set of said full-word values, and a tag which is used as a key to determine whether a value in said set of full-word values comprises a value associated with the presented address;

if a tag in said presented address matches a tag in said buffer, returning a full-word value in said buffer which is associated with said tag, and storing the returned full-word value in a destination register of an instruction which originated said presented address; and if a tag in said presented address does not match a tag in said buffer, generating a fault and branching control to a pre-defined handler, wherein if said originating instruction comprises a pointer extract instruction, then:

if said destination register includes a sentinel value for null, then said destination register is cleared; and if said destination register does not include a sentinel value for null, then an offset from said originating instruction is added to a content of a source register to produce an effective address from which a content of said destination register were loaded, and to a content of said destination register to convert said content from a relative pointer to an absolute pointer.

6. The method of claim 1, wherein said instruction comprises a Store and Compress Halfword Unsigned (schu) instruction.

7. A method of performing data and pointer compression, comprising:

in a buffer which is formed between a processor and a level one cache and stores plural tags and full-word values associated with said tags:

when said buffer is presented with an address, breaking said address into a line number which indexes a set of said full-word values, and a tag which is used as a key to determine whether a value in said set of full-word values comprises a value associated with the presented address;

if a tag in said presented address matches a tag in said buffer, returning a full-word value in said buffer which is associated with said tag, and storing the returned full-word value in a destination register of an instruction which originated said presented address; and if a tag in said presented address does not match a tag in said buffer, generating a fault and branching control to a pre-defined handler, wherein if said instruction comprises a Load and Uncompress Halfword Signed (luh) instruction, then a maximum negative value acts as an overflow sentinel, and said half-word is sign-extended.

8. The method of claim 1, wherein said instruction comprises a Store and Compress Halfword Signed (sch) instruction.

9. A method of performing data and pointer compression, comprising:
 in a buffer which is formed between a processor and a level one cache and stores plural tags and full-word values associated with said tags:
  when said buffer is presented with an address, breaking said address into a line number which indexes a set of said full-word values, and a tag which is used as a key to determine whether a value in said set of full-word values comprises a value associated with the presented address;
  if a tag in said presented address matches a tag in said buffer, returning a full-word value in said buffer which is associated with said tag, and storing the returned full-word value in a destination register of an instruction which originated said presented address; and
  if a tag in said presented address does not match a tag in said buffer, generating a fault and branching control to a pre-defined handler,
 wherein if said instruction comprises a Load and Uncompress Byte Unsigned (lubu) instruction, then:
  if a value loaded by said instruction is less than a maximum unsigned byte quantity, said value is returned in said destination register, zero-extended; and
  if said value is not less than the maximum unsigned byte quantity, an effective address is used as a key to look up a full-word value in said buffer.

10. A method of performing data and pointer compression, comprising:
 in a buffer which is formed between a processor and a level one cache and stores plural tags and full-word values associated with said tags:
  when said buffer is presented with an address, breaking said address into a line number which indexes a set of said full-word values, and a tag which is used as a key to determine whether a value in said set of full-word values comprises a value associated with the presented address;
  if a tag in said presented address matches a tag in said buffer, returning a full-word value in said buffer which is associated with said tag, and storing the returned full-word value in a destination register of an instruction which originated said presented address; and
  if a tag in said presented address does not match a tag in said buffer, generating a fault and branching control to a pre-defined handler,
 wherein if said originating instruction comprises a pointer compress instruction, then:
  if a pointer in a source register is null, said pointer is changed to a sentinel value; and
  if said pointer in said source register is not null, said pointer is converted into a relative pointer by subtracting an effective address and said relative pointer is stored in said destination register.

11. The method of claim 1, wherein said buffer comprises a software-implemented buffer.

12. The method of claim 11, wherein said buffer compresses data from 64 bits to 32 bits, 32 bits to 16 bits, 32 bits to 8 bits, and 16 bits to 8 bits.

13. The method of claim 12, further comprising:
 executing instructions which emulate a compressed load instruction and compressed store instruction via sequences of ordinary instructions.

14. The method of claim 13, wherein said executing instructions comprises compressing data using mostly relative addressing, such that most pointer values are stored in relative form, except for some distinguished subset of values that are stored in a different form.

15. The method of claim 1, wherein said buffer is part of a software virtual machine for a programming language which uses said buffer based on a likelihood of a value being compressible.

16. A programmable storage medium tangibly embodying a program of machine readable instructions executable by a digital processing apparatus to perform a method of performing data and pointer compression, said method comprising:
 in a buffer which is formed between a processor and a level one cache and stores plural tags and full-word values associated with said tags:
  when said buffer is presented with an address, breaking said address into a line number which indexes a set of said full-word values, and a tag which is used as a key to determine whether a value in said set of full-word values comprises a value associated with the presented address;
  if a tag in said presented address matches a tag in said buffer, returning a full-word value in said buffer which is associated with said tag, and storing the returned full-word value in a destination register of an instruction which originated said presented address; and
  if a tag in said presented address does not match a tag in said buffer, generating a fault and branching control to a pre-defined handler,
 wherein said level one cache stores compressed and uncompressed data,
 wherein said processor accesses said level one cache and executes a set of instructions for operating on said compressed data, and executes another set of instructions which are different than said set of instructions, for operating on said uncompressed data, and
 wherein said set of instructions and said another set of instructions comprise load instructions and store instructions.

17. The method of claim 4, wherein said buffer comprises a hardware hash table accelerator which is indexed by an effective address, and augmented with special instructions to support value compression.

18. The method of claim 5, wherein the pointer extract instruction treats a value loaded by a load and uncompress halfword signed (luh) instruction as an encoded relative pointer.

19. The method of claim 7, wherein the processor comprises a central processing unit (CPU) and the level one cache is formed on a same chip as the CPU.

20. The method of claim 9, wherein the tag of the address includes high bits and a low bit of the effective address, and the line number of the address includes bits between the high bits and the low bit.

* * * * *